US012715021B2

(12) United States Patent
Halpenny-Mason et al.

(10) Patent No.: US 12,715,021 B2
(45) Date of Patent: Aug. 25, 2026

(54) ULTRASOUND INTERCONNECT STACK AND METHOD OF MANUFACTURING SAME

(71) Applicant: DarkVision Technologies Inc., North Vancouver (CA)

(72) Inventors: Michael Halpenny-Mason, North Vancouver (CA); Jeffrey Scott Jordan, Indianapolis, IN (US)

(73) Assignee: DarkVision Technologies Inc., North Vancouver (CA)

(*) Notice: Subject to any disclaimer, the term of this patent is extended or adjusted under 35 U.S.C. 154(b) by 256 days.

(21) Appl. No.: 18/702,816

(22) PCT Filed: Dec. 15, 2022

(86) PCT No.: PCT/IB2022/062277
§ 371 (c)(1),
(2) Date: Apr. 19, 2024

(87) PCT Pub. No.: WO2023/111926
PCT Pub. Date: Jun. 22, 2023

(65) Prior Publication Data
US 2024/0416386 A1 Dec. 19, 2024

(30) Foreign Application Priority Data
Dec. 17, 2021 (GB) ...................................... 2118476

(51) Int. Cl.
*G01N 29/24* (2006.01)
*B06B 1/06* (2006.01)

(52) U.S. Cl.
CPC ............ *B06B 1/0685* (2013.01); *B06B 1/067* (2013.01); *G01N 29/245* (2013.01)

(58) Field of Classification Search
CPC ...... G01N 29/245; B06B 1/0685; B06B 1/067
USPC ........................................................... 73/658
See application file for complete search history.

(56) References Cited

U.S. PATENT DOCUMENTS 7,791,252 B2 9/2010 Baumgartner
8,604,671 B2 12/2013 Shikata
(Continued)

FOREIGN PATENT DOCUMENTS

CN 113042348 A 6/2021
CN 113161475 A 7/2021
(Continued)

OTHER PUBLICATIONS

International Search Report and Written Opinion issued in corresponding PCT Application No. PCT/IB2022/062277, mailed on May 1, 2023, 10 pages.
(Continued)

*Primary Examiner* — Peter J Macchiarolo
*Assistant Examiner* — Rodney T Frank

(57) ABSTRACT

An acoustic device and method of manufacturing same. The device may be used to inspect tubulars and parts with high resolution. The acoustic device may include a 2D ultrasonic transducer layer and an ASIC connected to each other by an array of conductive wires. A non-conductive, acoustic damping material is flowed and set around the wires, to form a thick acoustic backing layer. Manufacturing the ultrasonic transducer may involve wire bonding. Electrical Discharge Machining or supporting rigid posts on a substrate. A surface of the backing layer may be machined, plated and diced to create conductive pads to connect the transducer layer to the wires then to the ASIC.

20 Claims, 13 Drawing Sheets

(56) References Cited

U.S. PATENT DOCUMENTS

| | | | | |
|---|---|---|---|---|
| 9,408,588 | B2 * | 8/2016 | Huang | B06B 1/0292 |
| 10,310,061 | B2 | 6/2019 | Angelsen | |
| 10,478,858 | B2 * | 11/2019 | Lasiter | B06B 1/0666 |
| 11,672,179 | B2 * | 6/2023 | Rothberg | B06B 1/0292 310/334 |
| 11,813,116 | B2 * | 11/2023 | Davidsen | A61B 8/445 |
| 2008/0315331 | A1 * | 12/2008 | Wodnicki | B06B 1/0629 257/E27.122 |
| 2019/0027675 | A1 | 1/2019 | Choi | |
| 2019/0231308 | A1 | 8/2019 | Ichikawa | |
| 2021/0186461 | A1 | 6/2021 | Katsura | |

FOREIGN PATENT DOCUMENTS

| | | | |
|---|---|---|---|
| JP | 2002095090 | A | 3/2002 |
| JP | 2002345094 | A | 11/2002 |
| JP | 2004363746 | A | 12/2004 |
| JP | 2008047971 | A | 2/2008 |
| JP | 2015011969 | A | 1/2015 |
| JP | 2017073662 | A | 4/2017 |
| JP | 2019129511 | A | 8/2019 |
| WO | 2017143307 | A1 | 8/2017 |

OTHER PUBLICATIONS

Greenstein, et al., "A 2.5 MHz 2D Array with Z-axis Electrically Conductive Backing," IEEE Transactions on Ultrasonics, Ferroelectrics, and Frequency Control, vol. 44, No. 5, Sep. 1997, pp. 970-977.

International Preliminary Report on Patentability (Chapter I) received for PCT Application No. PCT/IB2022/062277, mailed on Jun. 27, 2024, 8 Pages.

* cited by examiner 3
35
15
16

47
30
7
30

ULTRASOUND INTERCONNECT STACK AND METHOD OF MANUFACTURING SAME

RELATED APPLICATION

This application is a U.S. National Phase Patent Application of International Patent Application No. PCT/IB2022/062277, filed on Dec. 15, 2022, which claims priority to United Kingdom Patent Application No. 2118476.7 filed on Dec. 17, 2021, which is are incorporated herein by reference in its entirety their entireties.

FIELD OF THE INVENTION

The invention relates generally to imaging devices, in particular, structures for 2D ultrasound arrays and their connections.

BACKGROUND OF THE INVENTION

Ultrasound transducers are often used in Non-destructive Testing (NDT) and industrial imaging tools to determine properties of the object being tested. Such transducers are provided as a stack of composite PZT to transmit and receive acoustic waves, a lens layer on the transmission surface, a matching layer and a backing layer, as shown in FIG. 2.

Transducers can be provided as an array, with some high-resolution transducers provided as a two-dimensional array. This creates a formidable challenge in connecting all the individual elements of the array to the drive circuit. There are additional challenges for that circuit to address each element or multiplex them.

There is a need to avoid soldering due to the temperature required for reflow soldering being too high for the PZT composite and backing layer to withstand. Additionally, thermal expansion mismatch between the backing layer and the substrates is very large and creates high stresses.

Application Specific Integrated Circuits (ASIC) are sometimes used to connect and drive these 2D arrays. Various ways have been devised to connect an ASIC to an ultrasound array, but these tend to have some manufacturing complications and acoustic imperfections. One method involves drilling holes in a non-conductive epoxy matrix and back filling the holes with conductive epoxy.

SUMMARY OF THE INVENTION

The present invention provides an improved ultrasonic stack and method of manufacturing same in an efficient manner and having improved acoustic properties.

According to one inventive aspect there is provided a method of manufacturing an ultrasonic transducer comprising the steps of: providing an ultrasonic transducer layer having a two-dimensional array of electrodes defining ultrasonic elements: providing an electrical interconnect layer having a two-dimensional array of bond pads: providing a two-dimensional array of conductive wires: flowing a non-conductive, acoustic damping material around the wires: setting the non-conductive, acoustic damping material to form an acoustic backing layer having a thickness of at least 4 mm; and electrically coupling the conductive wires at their first ends to the bond pads of the electrical interconnect layer and at their second ends to the electrodes of the ultrasonic transducer layer.

According to another inventive aspect there is provided an acoustic device comprising: an ultrasonic transducer layer having a two-dimensional array of electrodes defining ultrasonic elements; an electrical interconnect layer having a two-dimensional array of bond pads: a two-dimensional array of conductive wires, electrically coupled at their first ends to the bond pads of the electrical interconnect layer and at their second ends to the electrodes of the ultrasonic transducer layer; and a non-conductive, acoustic damping material formed around the wires, to form an acoustic backing layer having a thickness of at least 4 mm.

According to another inventive aspect there is provided a method of manufacturing an ultrasound stack comprising the steps of: wire bonding a plurality of wires between first conductive pads of a first support substrate and second conductive pads of a second support substrate; and flowing a non-conductive, acoustic damping material around the wires to set and form an acoustic backing layer that is 4-6 mm thick. The first support substrate is a two-dimensional ultrasonic transducer array or the plurality of wires are connected at first ends to said two-dimensional ultrasonic transducer array. The second support substrate is a two-dimensional electrical interconnect layer or the plurality of wires are connected at second ends to said two-dimensional electrical interconnect layer.

Preferred embodiments of any of the above inventive aspects may be implemented as described in the detailed description and may include one or more following features:

The conductive wires are enclosed in a mold prior to flowing and setting the acoustic damping material, which mold has a width and length sufficient to cover the ultrasonic transducer layer's array of electrodes and a thickness of at least 4 mm.

The two-dimensional array of conductive wires are supported at their first and second ends by first and second support substrates respectively, which support substrates are parallel to and offset from each other by at least 4 mm.

The two-dimensional array of conductive wires is created by a wire bonding tool that bonds the array of wires between first conductive pads of a first support substrate and second conductive pads of a second support substrate.

The first support substrate is one of: the ultrasonic transducer layer or the electrical interconnect layer, wherein the electrical interconnect layer is preferably an integrated circuit (IC), Application Specific Integrated Circuits ASIC, or Low Temperature Co-Fired Ceramic.

The second support substrate is a sacrificial substrate, preferably a circuit board, the method further comprising the step of removing the sacrificial substrate after the steps of flowing and setting.

One or both support substrates are removed by machining, grinding, or etching to provide a flat surface of the backing layer, preferably further comprising adding a metal layer over this flat surface, then cutting through the metal layer to form an array of backing layer pads.

The first support substrate and second support substrate are not co-planar, preferably forming an angle of 60-120° to each other, more preferably wherein the support substrates are orthogonal to each other.

The two-dimensional array of spaced-apart conductive wires is created by Electrical Discharge Machining.

The two-dimensional array of spaced-apart conductive wires is created by inserting an array of rigid pins into arrays of guide holes on first and second support substrates that are spaced apart.

An adhesive layer is provided between the backing layer and the array of electrodes or array of bond pads, said adhesive layer entraining conductive particles.

The array of conductive wires has a pitch the same as the transducer's electrodes and as the electrical interconnect layer's bond pads.

The electrical interconnect layer is one of: an integrated circuit (IC), Application Specific Integrated Circuit (ASIC), or Low Temperature Co-Fired Ceramic (LTCC).

There is an array of backing layer pads is connected to the first and/or second ends of the wires.

There is an adhesive layer between the backing layer and the array of electrodes or array of bond pads, said adhesive layer entraining conductive particles.

The non-conductive, acoustic damping material comprises non-conductive epoxy, preferably having an acoustic impedance lower than the acoustic transducer layer, more preferably having an acoustic impedance between 7 and 12 MRayls.

These inventive aspects provide a connection between an acoustic transducer array and circuitry while also having optimal acoustic properties.

BRIEF DESCRIPTION OF THE DRAWINGS

Various objects, features and advantages of the invention will be apparent from the following description of embodiments of the invention, as illustrated in the accompanying drawings. The drawings are not necessarily to scale, emphasis instead being placed upon illustrating the principles of various embodiments of the invention.

DETAILED DESCRIPTION OF THE INVENTION

Figure 1:
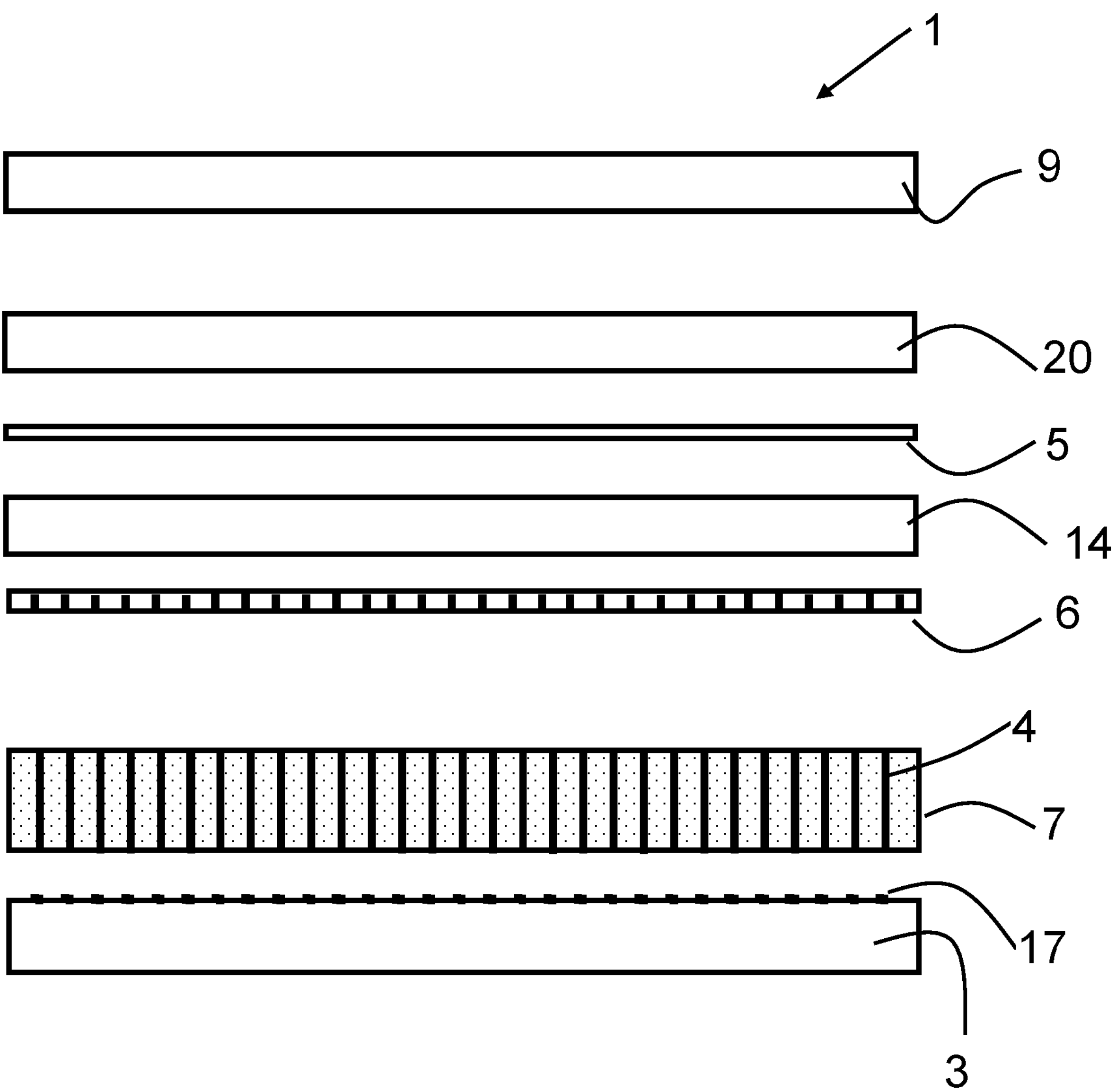
FIG. 1 is a side view of an exploded stack for an ultrasound device.

With reference to the accompanying figures, an ultrasound device and methods of manufacturing are disclosed for a 2D ultrasound array that is mechanically and electrically connected to a circuit. As shown in exploded FIG. 1, the ultrasound stack 1 comprises a lens 9, matching layer 20, PZT composite 14, common electrode 5, backing layer 7, and ASIC 3. Individual electrodes 6 are connected by wires 4 to bond pads 17 on the top surface of the ASIC.

The internal circuits of the integrated circuit (IC) or, more particularly Application Specific Integrated Circuits (ASIC), selectively drive voltages to certain bond pads, which activate individual transducer elements of the PZT composite through the wires. Thus the array of wires 4 are spaced-apart and surrounded by non-conducting material 8 to prevent activation or cross-talk with other elements. The activated PZT posts move out of plane to pulse a wave that travels outwards through the matching layer, common electrode and lens. The wave also travels backwards through the backing layer and ASIC. Thus a second function of the backing layer is to dampen this back-propagating wave.

Figure 3:
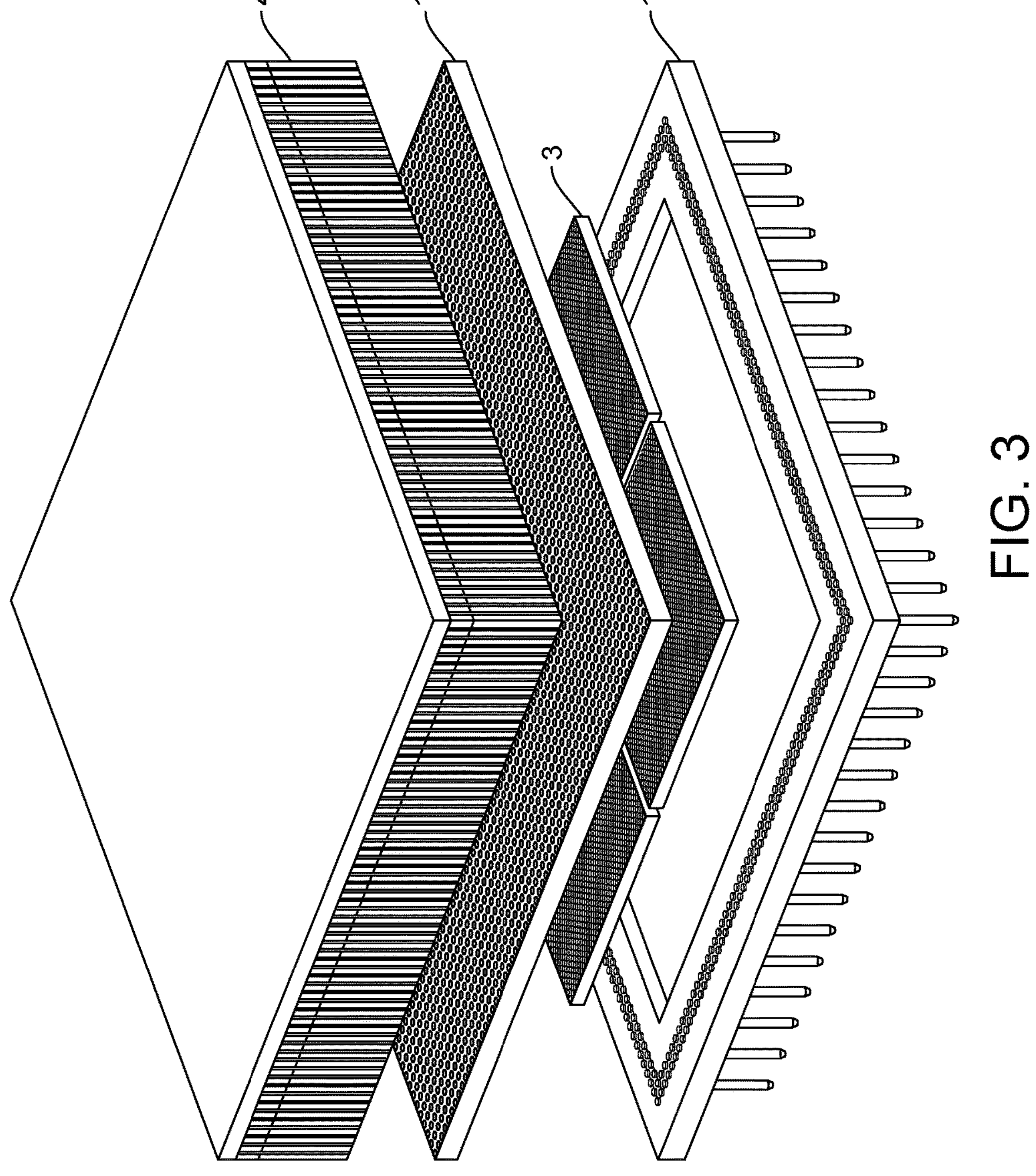
FIG. 3 is a perspective-view of the exploded ultrasound device.
Figure 4:
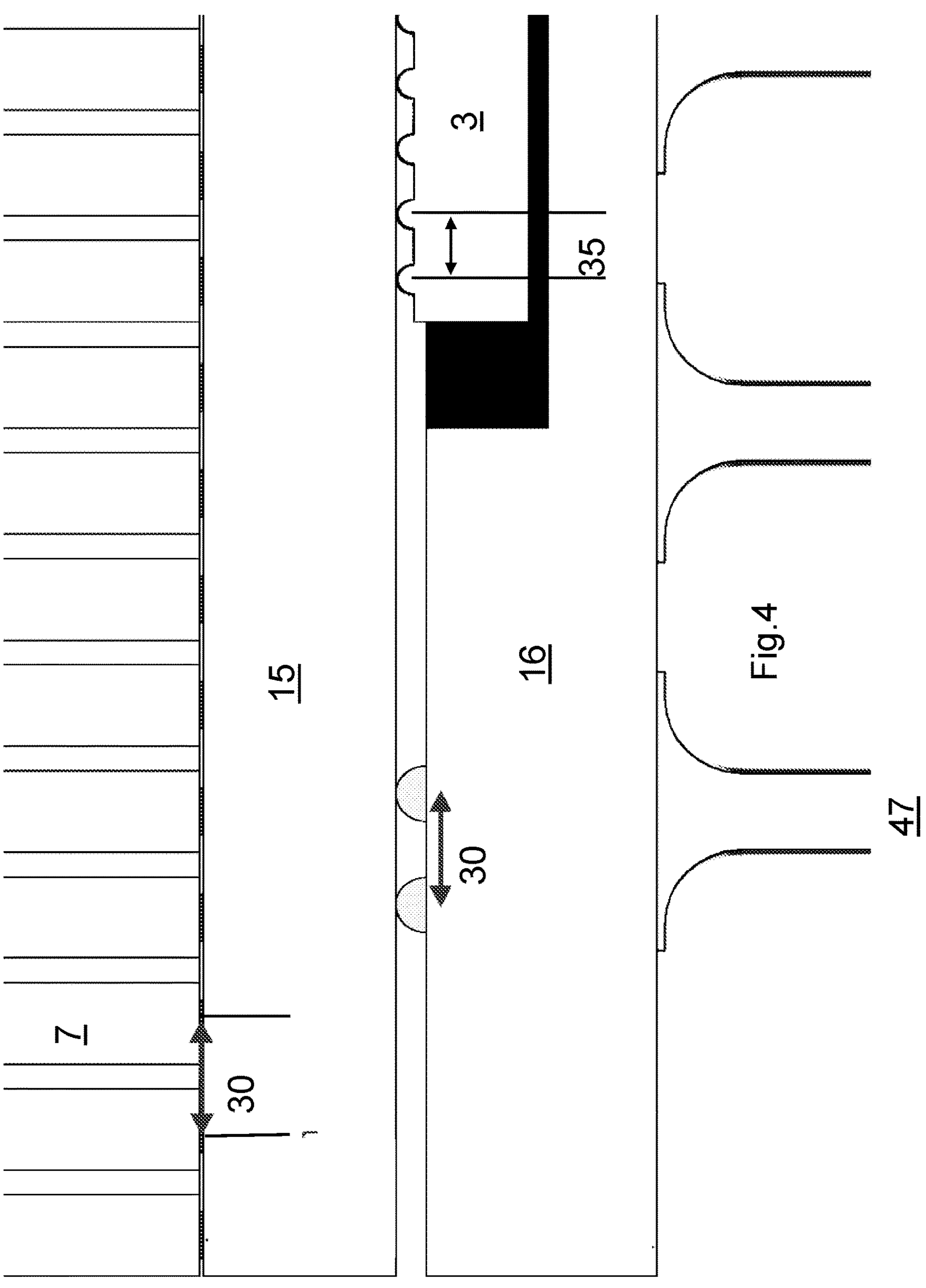
FIG. 4 is a is a side detailed view of part of an ultrasound device having interposing layers.
Figure 5:
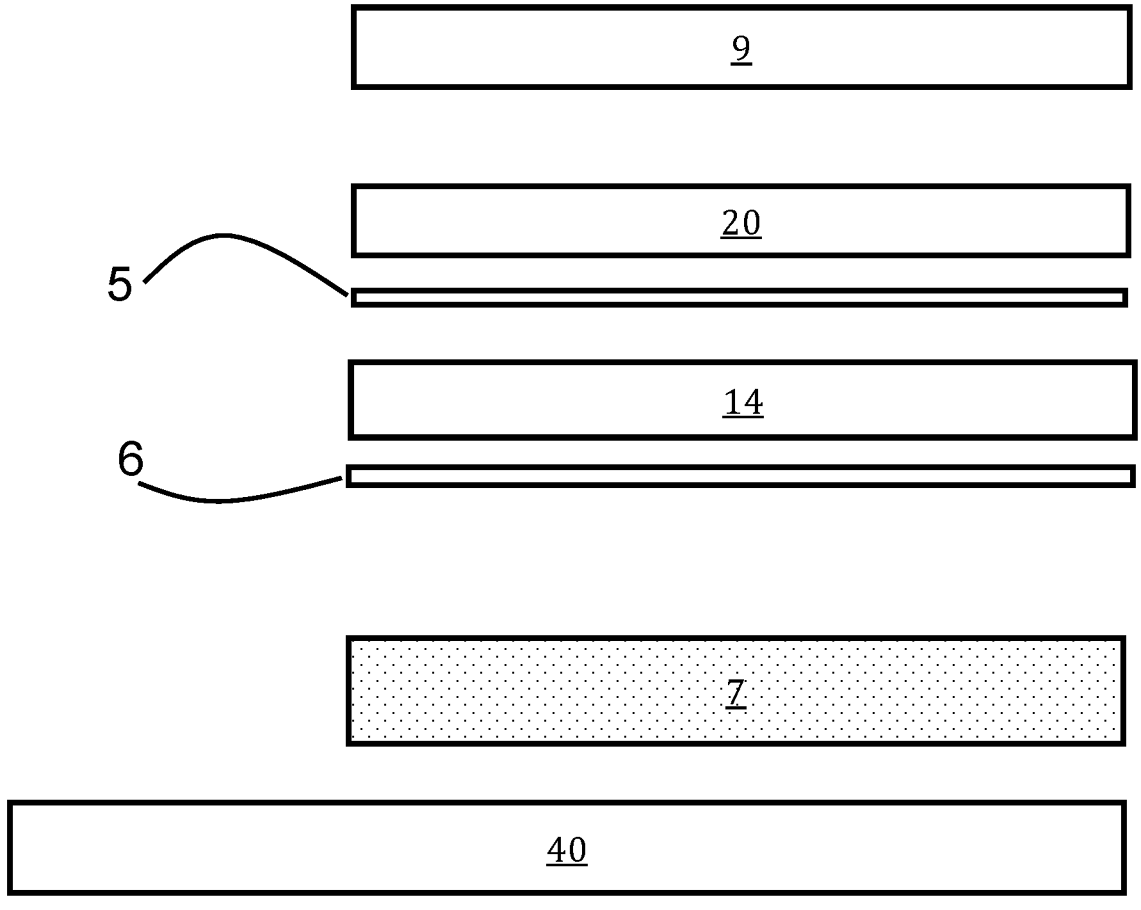
FIG. 5 is a side view of a stack for an ultrasound device with a flexible connector.

FIG. 3 shows the transducer in isometric view, where the array is arranged in a regular pattern with N×M elements and pitch 30. In preferred embodiments there are at least 4096 (e.g. 64×64) elements, more preferably at least 16000 (e.g. 128×128). The pitch 30 is preferably less than 500 um, more preferably about 300 um. The individual piezoelectric posts are diced into the substrate of PZT composite 14, with plural posts acting together as an individual transducer element 10, as known in the art.

A thin metal layer is coated onto the bottom of the PZT and separated into individual electrodes 6. The top of the PZT composite is covered by a thin metal layer to act as a common electrode 5. Thus plural PZT posts are activated for a given transducer element when a drive voltage is selectively applied between common electrode 5 and the relevant individual electrode 6. These electrode layers may be deposited by vapor deposition or other methods known in the art.

Above the PZT layer there is typically a matching layer 20 and lens 9. The matching layer material is typically chosen to have an impedance that is the geometric mean of the PZT composite and the lens material. For example, the matching layer may be 0.167 mm thick epoxy filled with Aluminum oxide powder to give an impedance of 9 MRayls. The lens provides the curvature to focus the wave as desired and should be made of a material suited to the coupling fluid. In industrial applications, the lens may be made of PEEK.

While in prior devices, the elements were connected with hundreds of wires and multiplexers to a drive circuit and processor, the present device may use an Application Specific Integrated Circuit (ASIC) that is physically and electrically indirectly connected to the transducer layer, using a backing layer therebetween. The top layer of the ASIC 3 may have bond pads 17 with a pitch the same as the transducer electrodes 6. The ASIC's bond pads may be of a smaller pitch if a separate electrical interconnect layer is used to reroute the connections. In this case, the electrical interconnect layer's bond pads connect to the transducer layer with the backing layer in between. Traditional bonding and routing techniques cannot be used for the interconnect because neither the interconnect layer nor the ASIC provide the correct acoustic properties, i.e. sufficient damping to attenuate the backwards wave. Common techniques for providing an interconnect do not include highly attenuative materials or are not applied thick enough to be sufficiently attenuative.

Figure 2:
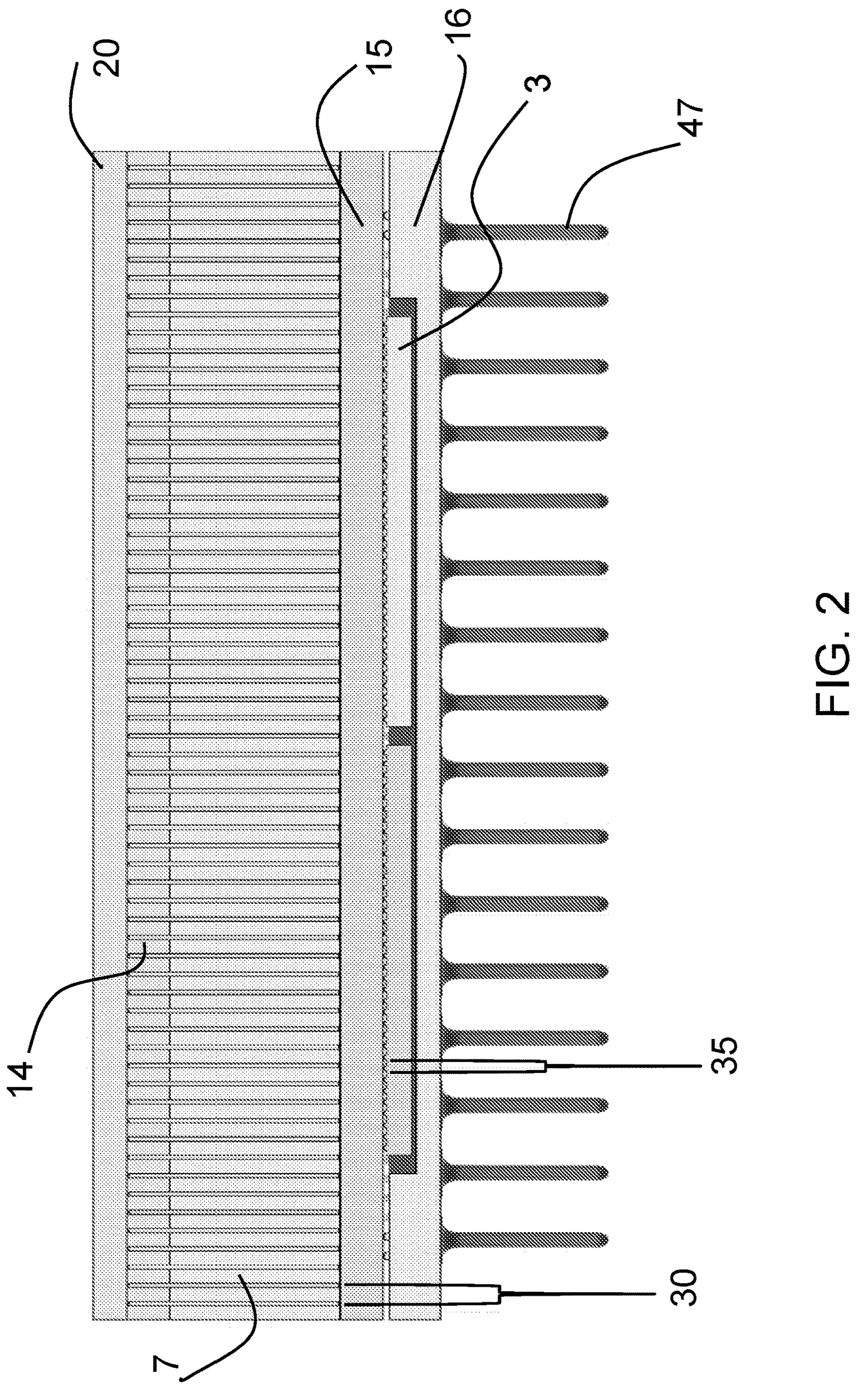
FIG. 2 is a side view of an assembled ultrasound device.

As shown in FIG. 2, the ASIC may be connected by another electrical interconnect substrate, such as Low Temperature Co-Fired Ceramic (LTCC) 15. The top of this interconnect substrate has bond pads aligned to the transducer electrodes 6. There are interconnect conductors routed from the top of this interconnect substrate to its bottom, where the interconnect substrate electrically connects to bond pads of the ASIC, flexible connector or another circuit board. This allows the ASIC or other circuit to be manufactured without constraining its pinout and geometry, while using a finer pitch 35 than the transducer pitch 30. For example, there may be plural ASICs with smaller pitch 35 that connect to upper LTCC 15, which then connect to lower LTCC 16. LTCC 16 may have larger pitch pins 47 to connect the ASIC to some larger processing circuit 45 (see FIG. 10).

Thus, a backing layer is provided between the circuit and ultrasonic transducer, aligned to connect acoustic electrodes 6 to pads 17 using conductive wires 4. The backing layer also attenuates the backward wave, so the bulk of the layer is highly acoustically attenuative. There is an inherent tradeoff between and bandwidth when you change the impedance of the backing layer. Here, low bandwidth returns blurry images, whereas high bandwidth returns sharp images. The present solution solves the contradictions of a) being electrically conductive and also insulating and of b) being precisely aligned in the X, Y axes, while also thick in the Z-axis. The backing layer may have an impedance of 7-12 Mrayls, being lower than that of the transducer layer's material, e.g. ceramic PZT.

In certain embodiments the backing layer is at least 3 mm thick, more preferably 4-6 mm thick, in order to achieve sufficient damping. The backing layer's thickness is in a direction away from the transducer layer's array of electrodes. The width and length of the backing layer are sufficient to cover the transducer layer's array of electrodes. The wires 4 occupy less than 50% of the total volume of the backing layer, and more preferably less than 20% of the volume, in order to provide maximum damping properties. The wires are solid metal, such as copper, silver or gold. The matrix damping material 8 may comprise 70-90% tungsten or cerium oxide particles 50 by weight to increase attenuation and impedance.

In one embodiment, the quantity of wires 4, electrodes 6 and bond pads 17 are provided in a 1:1:1 ratio and precisely aligned with each other. The wires are much thinner than the ultrasonic electrodes and pads but have the same pitch. By way of example, the pitch is 300 um, the electrode width (or diameter) is 200 um, and the wire width is 50 um.

Figure 8:
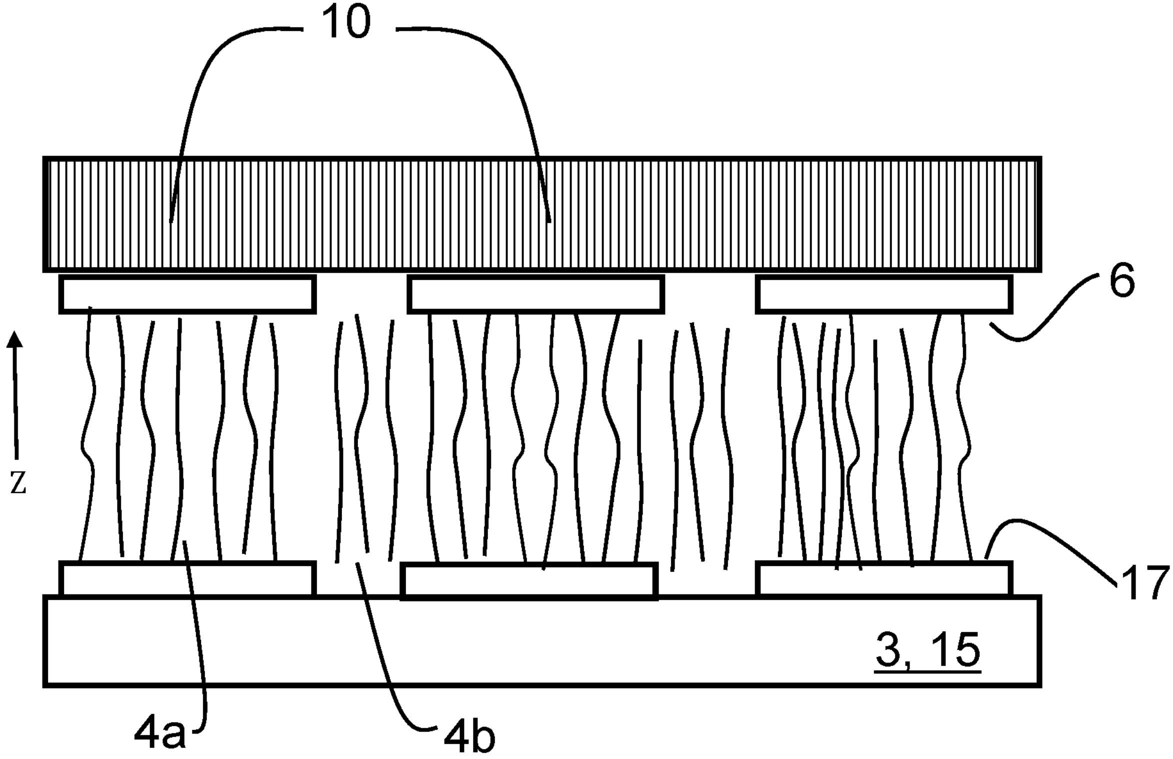
FIG. 8 is a close-up view of field-aligned conductors between pairs of electrodes.

FIG. 8 shows a backing layer arranged in a 'many wires per electrode' embodiment. Here, the vertical wires are provided in excess and not specifically aligned to any transducer electrode 6, provided that the pad 17 and electrode 6 are themselves aligned. The wires are not thick enough to bridge two neighbouring electrodes/pads on the same substrate. Most of the wires **4*a* redundantly connect electrode-pad pairs and some wires 4*b* are unused or wasted, not connecting any electrodes. The redundancy improves transducer yield as a few faulty wires will not leave any electrode-pad pair unconnected. Depending on the manufacturing techniques used, the unused wires may be conductive filaments 4*b*** that do not connect to anything or be conductive particles that have not formed a fully aligned wire in the Z-direction.

There are existing materials that may be repurposed or modified to form backing layer 7. These are sometimes called anisotropic conductive films (ACF), anisotropic conductive epoxies (ACE), or Z-axis conductive layers, where Z refers to the out of plane direction.

Figure 6A:
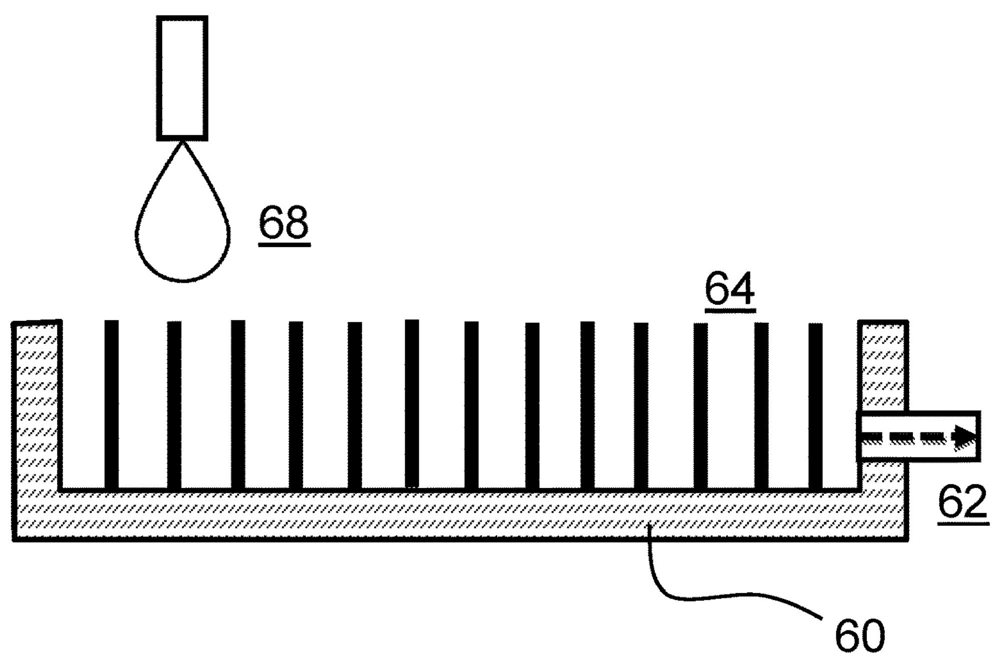
FIG. 6A is an illustration of a mold for a backing layer.
Figure 6B:
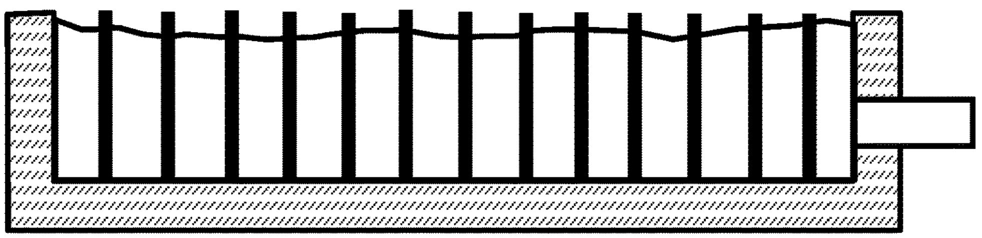
FIG. 6B is an illustration of a filled mold for a backing layer.
Figure 6C:
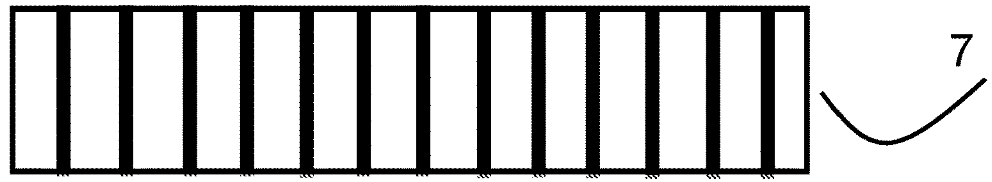
FIG. 6C is an illustration of a molded, polished backing layer.

An array of vertically aligned solid wires may be provided inside a mold then the non-conductive, acoustic damping material 68 is added in and around the wires. FIG. **6*a* shows an example where conductive wires 64 are provided, connected at one end to a mold support substrate 60 and then fluid, non-conductive epoxy 68 or thermosetting plastic is flowed around the wires (FIG. 6B) under vacuum to set and form the damping matrix. The non-conductive, acoustic damping material may be set using one or more of heat, pressure, and UV lighting, depending on the epoxy chosen. The wires, in cross-section, may be circular for simplicity or a cross for lateral stability. The wires 4 become held within damping matrix 8, which when removed from the mold 60, are machined at the top surface to form the backing layer 7, as shown further in FIG. 12**.

The mold's dimensions are typically the same as the desired backing layer (i.e. of width and length sufficient to cover the major surface of the transducer layer), and a thickness in a direction normal to that major surface and sufficiently thick to damper the acoustic energy (i.e. greater than 4 mm). The mold width and length may be multiples of the transducer size in order to make plural backing layers at once and then diced OR cover plural transducers with one backing layer.

Figure 7:
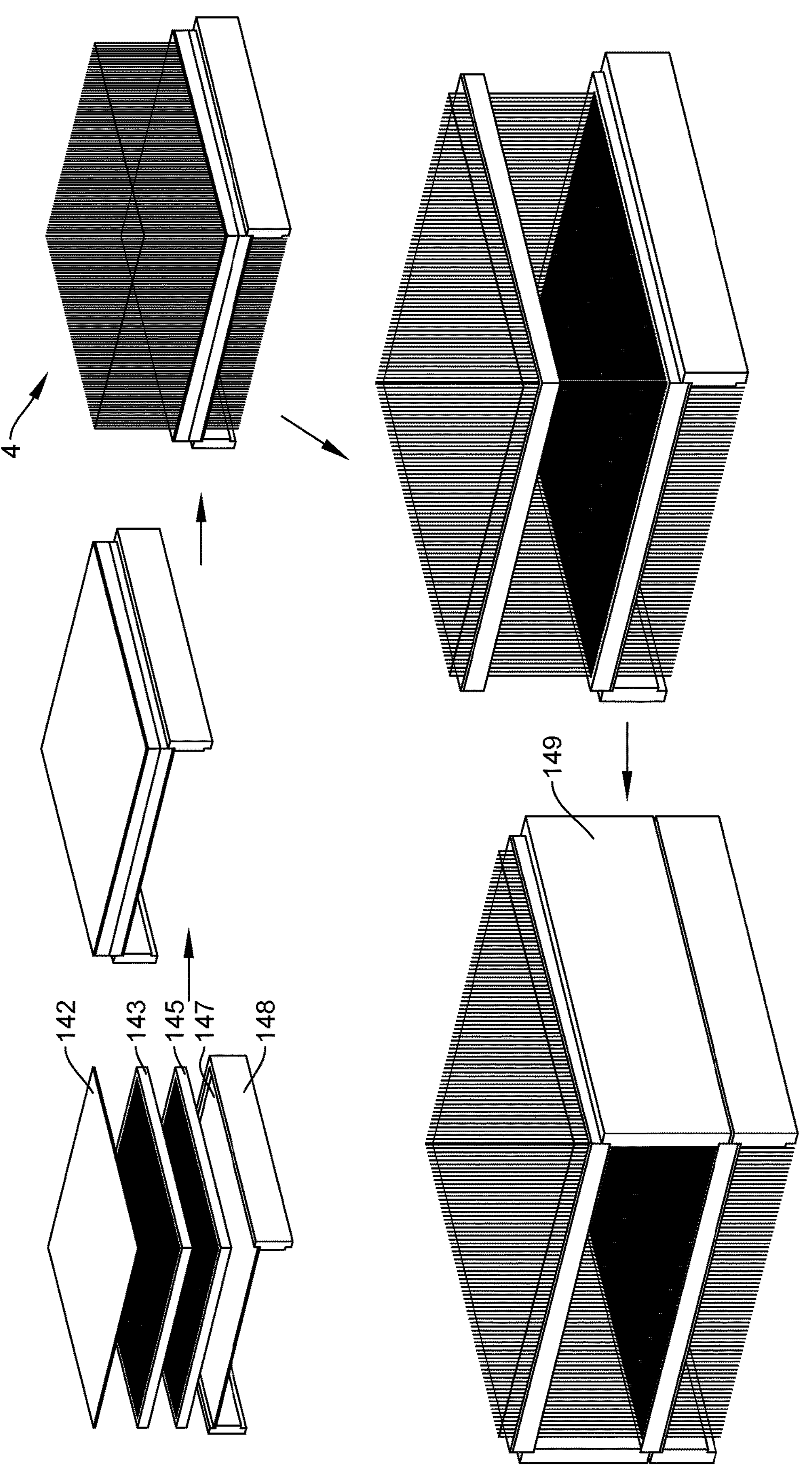
FIG. 7 is a perspective view of steps for a wire piercing array with a membrane.

FIG. 7 illustrates another process for forming the backing layer using a jig with guide holes for holding a plurality of rigid pins, which become the wires 4. The jig may comprise upper diaphragm 142, upper guide substrate 143, lower guide substrate 145, lower diaphragm 147, offset spacer 148, and backing layer spacer 149. The diaphragms are thin membranes supported at their edges to be pierced by the pins and provide friction against each pin to prevent them slipping out of place. The guide substrates comprise a 2D array of holes that tightly accommodate the width of the pins. As shown, the jig components may initially be aligned and stacked vertically closely together. The plural pins are inserted through holes in the guide substrates, piercing the diaphragms. The pins may be tungsten rods and should be sufficiently rigid to poke through the diaphragms and into the guides without deforming. The upper and lower guide substrates are then separated from each other to the desired thickness of the backing layer. Spacer 149 holds the substrates apart and forms the mold walls. The flowable damping material is added to the mold, flowing around the pins and setting to form the acoustic damping matrix of the backing layer. The spacer, substrates and excess pin length are removed to leave just the backing layer with the array of wires. As described elsewhere, the top and bottom of the backing layer may be plated and cut to form backing layer pads at both ends of the wires.

In photolithography, layers of material are deposited, then areas are selectively masked, followed by etching of non-masked areas. This process is well understood in the field. Thus a structure can be built up that contains precisely arranged conductive and non-conductive areas. Typically these layers are thin, too thin to act as a attenuative backing layer. Thicker layers take longer to build up and/or struggle to create high aspect structures, such as the long thin wires. However certain materials, such as EPON SU-8 allows thicker microstructures that have high aspect ratio (40:1) and good sidewall integrity. When doped with conductive particles, these precisely located structures can be used to form the wires. The wires are then surrounded by non-conductive epoxy and then the bottom and top surfaces are polished flat.

In another concept, a non-conductive matrix material with embedded conductive particles is provided and subjected to an external field that aligns the conductive particles vertically, as shown in FIG. 8. The conductive particles become connected to each other to form vertically aligned wires extending from top to bottom surface of the backing layer by an external magnetic or electric field. The result is an anisotropic conductive film, where the wires remain vertically aligned even after the field is removed. Plural thin layers may be stacked because Anisotropic Conductive Films (ACF) tend to be sold thinner than needed for the attenuation properties of the backing layer.

Figure 9:
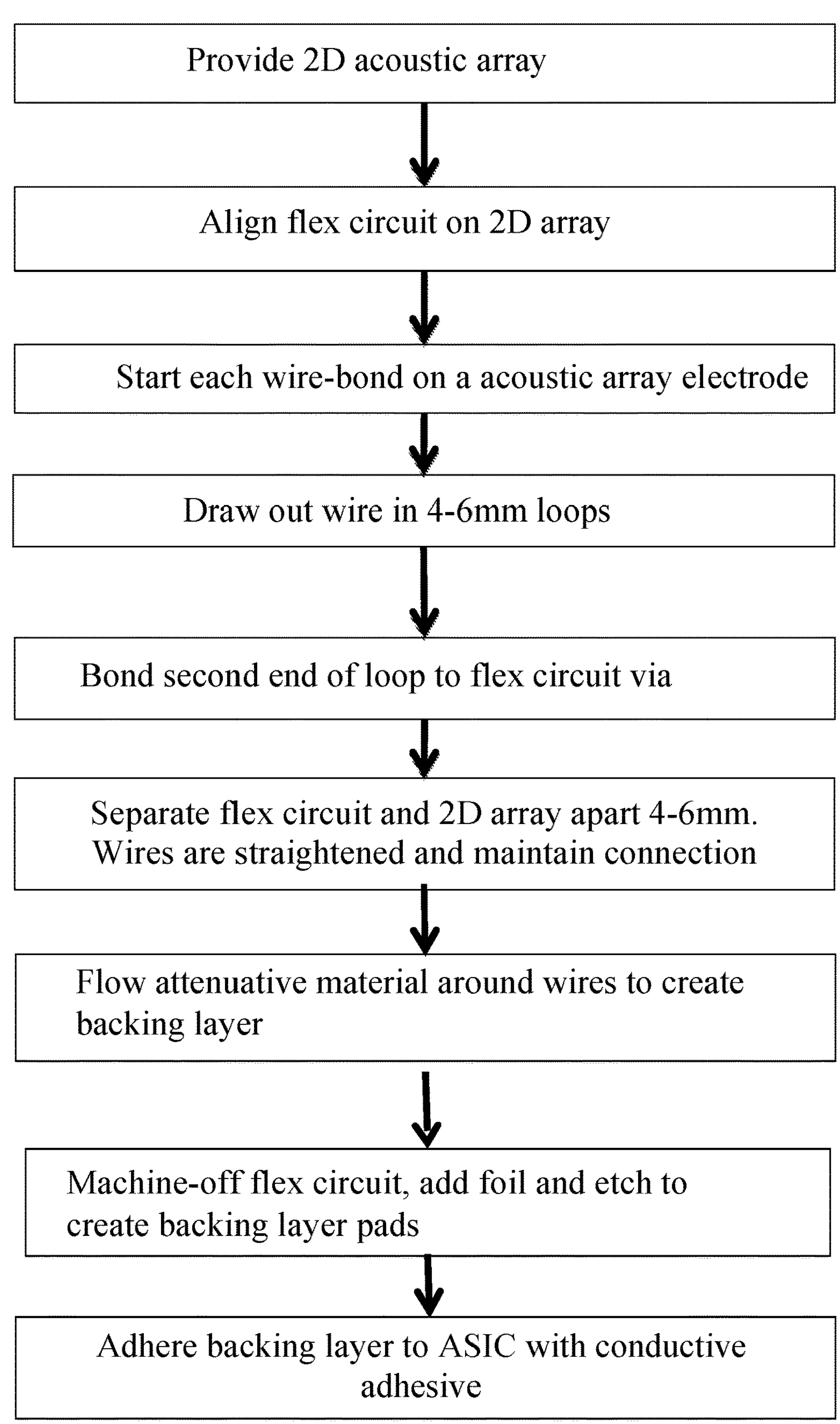
FIG. 9 is a flow chart for manufacturing an acoustic stack.
Figure 10:
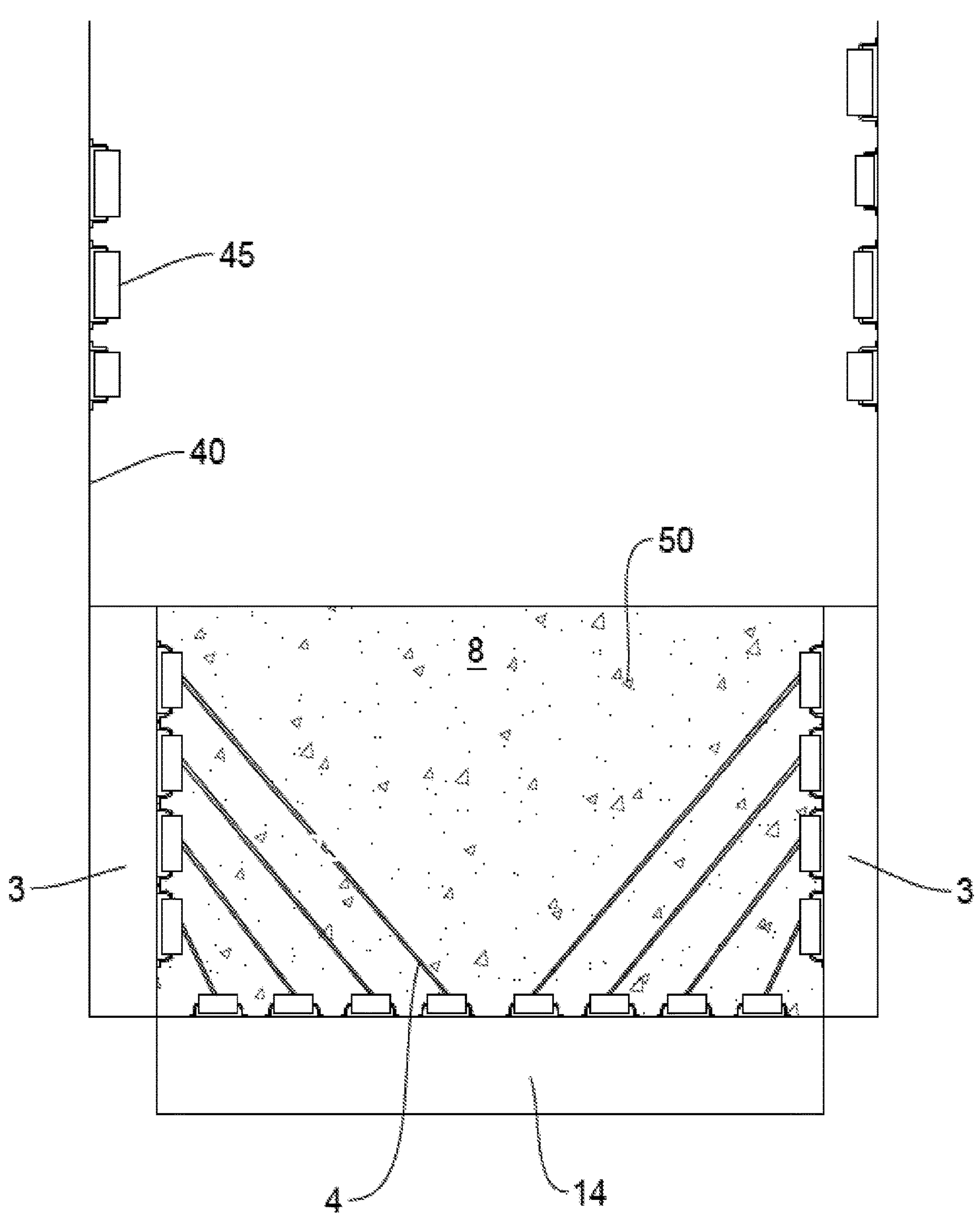
FIG. 10 is a side view of a wire bonding right-angle embodiment.
Figure 11:
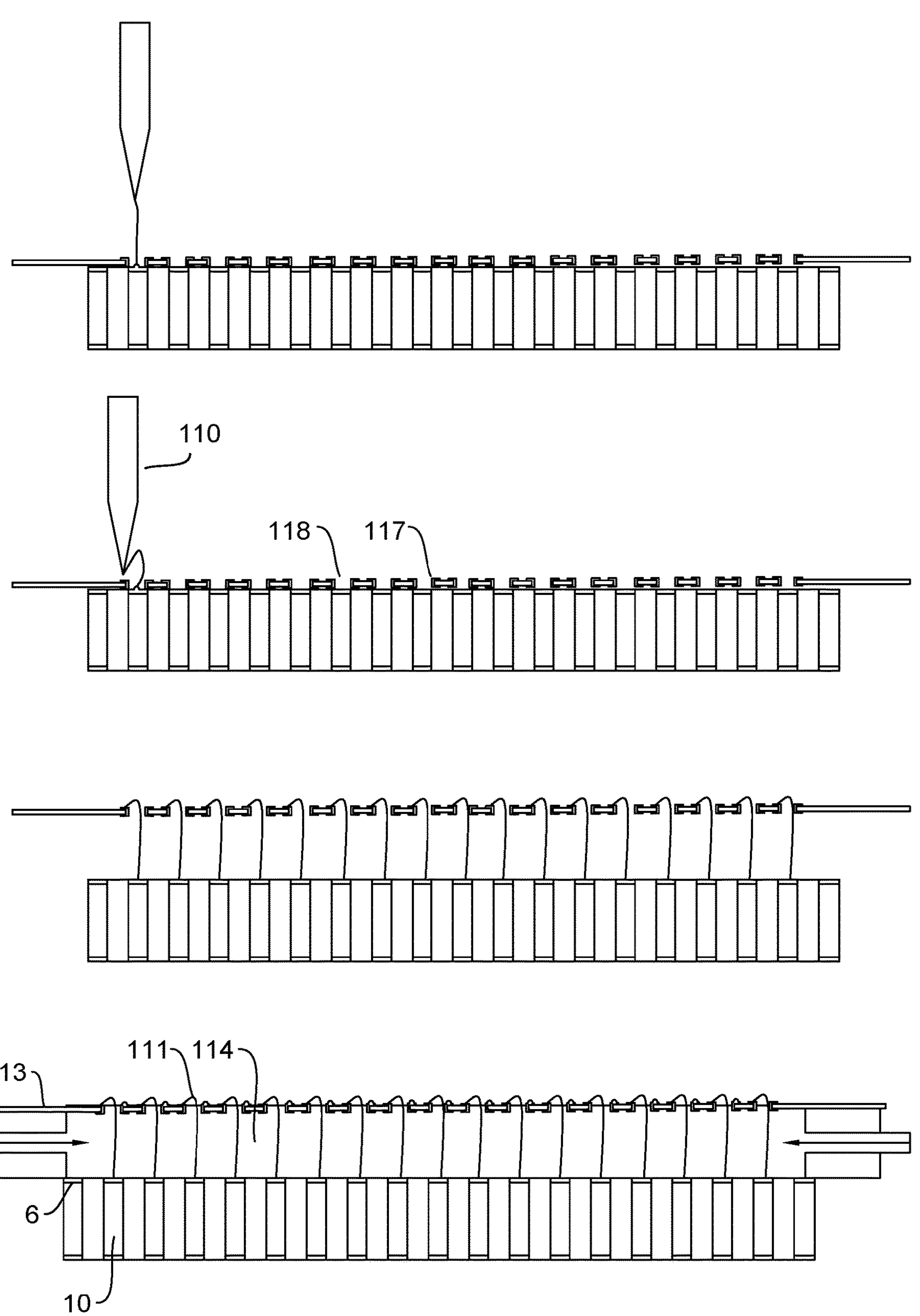
FIG. 11 is a side view of steps in a wire bonding process.

Alternatively, as shown in FIGS. 10, 11 and set out in the flowchart of FIG. 9, the wires 4 may be made by a wire bonding tool. Such tools are known to those skilled in the art and commercially available. They may be automatedly articulated in X, Y and Z to move between pads, tacking the wire at each pad. The bonding technique may be ball bonding, compliant bonding or wedge bonding, which use temperature, pressure or ultrasound to make a weld at the pad. First and second support substrates are held in a jig, while the wire bonding tool or the jig move to connect plural wires between arrays of pads of the support substrates. The tool tacks a first end of each wire to a first pad on the first substrate then tacks a second end of that wire to a second pad on the second substrate. The spooled wire is severed from the formed wire and the process is repeated for each of the hundred or more wires needed to create the wire array. The tool may form a loop of excess length in the wires to create slack, so that the two substrates may be moved apart to create a space of the thickness required for the backing layer. Such wire is available in gold and other metals with fine gauges (e.g. 10-25 um in diameter), which is small in area compared to the transducer element (in plan view), which element may be 200-500 um per side. Thus, most of the backing layer is made of acoustic damping material, e.g. more than 95% damping material, whose properties dominate the acoustic properties of the overall transducer.

Once all the wires are bonded and the substrates are in the desired spacing, the non-conductive material 68 is allowed to flow in and between wires to form the backing matrix. The support substrates may be the ASIC, transducer array, an interconnect layer, or a sacrificial layer (e.g., a circuit board) that is later machined off.

In the embodiment of FIG. 10, the ASICs 3 are provided to the side and at right angles to the transducer 14, instead of being co-planar, parallel or overlapping. The wires 4 thus run angled through the damping matrix 8. This arrangement provides more space for the wire bonding tool to move and decouples the pitch and spacing of the electrodes 6 relative to bond pads 17. As shown, a flex circuit 40 routes the signals from the ASIC to processing circuits 45. Advantageously, this moves the electronics away from the object being inspected and allows multiple transducer arrays to be tightly tiled together.

In this embodiment, the wire bonding tool head 110 rotates to connect to the generally orthogonal substrates. The two substrates may have their pad surfaces orthogonal to each other (per FIG. 10) or may form an obtuse angle up to 150°. In FIG. 10, a 2:1 ratio of first support substrates (ASICs) to second support substrate (transducer array) are shown wired together, but the ratio may be 4:1 or 1:1.

FIG. 11 illustrates a side, cross-sectional view of steps in a manufacturing method where the first and second support substrates are parallel, overlap and initially contact. In this example, the bottom support substrate is the transducer array and the top support substrate 113 is a circuit board. Alternatively, the bottom support substrate is the ASIC or interconnect layer. Alternatively, both support substrates are sacrificial substrates, such as circuit boards. A circuit board may be used, having an array of conductive vias 117, each via adjacent to a window 118, or indeed surrounding the window 118. Each wire 111 is bonded from the bottom substrate's electrode 6 thru the window and to the via 117 of the upper substrate 113. Typically, a wire bonding tool's head 110 is neither small enough nor has enough vertical travel to create taut wires between the substrates set 4-6 mm apart, so instead the support substrates start close together and a 4-6 mm wire loop is formed. A capillary head may be used at the tip of the wire bonding tool to fit through the windows 118. As shown in the third step of FIG. 11, the two substrates are then separated in a direction orthogonal to the substrates' major surfaces to form a void 114 of the desired backing layer thickness. The wires are now taut and do not touch each other. The substrates are held apart in a jig while the damping matrix material is flowed to fill the void and set.

Figure 12:
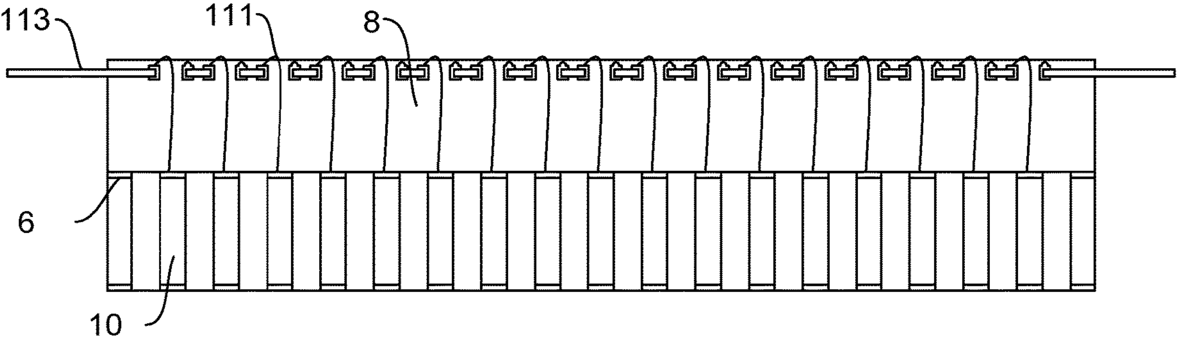
FIG. 12 is a side view of steps in a machining and plating process.
Figure 12:
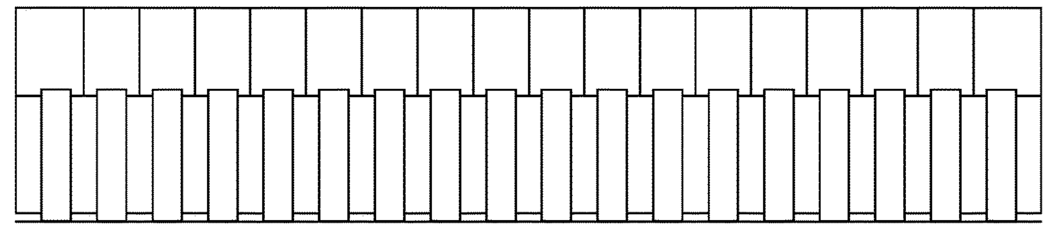
Figure 12:
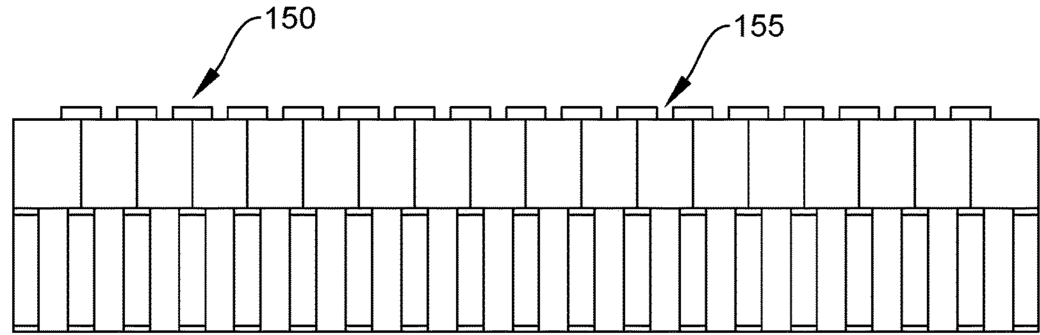

In some cases, the top surface of the backing layer may be level and have conductive pads in condition for immediate connection to the transducer array, ASIC, or interconnect layer. However, in many cases, the top will be uneven, the wires will have differing lengths and the wires themselves are not wide enough to make reliable contact with the transducer's pads or interconnect's pads. FIG. 12 illustrates three steps for finishing the backing layer after the damping matrix material has set using various embodiments discussed herein, in particular, following on from the wire bonding process of FIG. 11.

Initially, the backing layer is shown with bumpy wire loop 111 and uneven top substrate 113, which is a sacrificial substrate. This substrate 113 and loops 111 are then removed, preferably by machining, grinding or etching to leave a flat top surface with the array of fine wires held in place by the much larger damping matrix. Then the top surface is plated with a conductive layer or adhered to a conductive foil. A thin metal layer may be deposited, followed by a conductive adhesive, and then thicker foil layer. In the last stage of FIG. 12, kerf cuts 155 are made through the plate or foil to create the backing layer pads 150.

Figure 13:
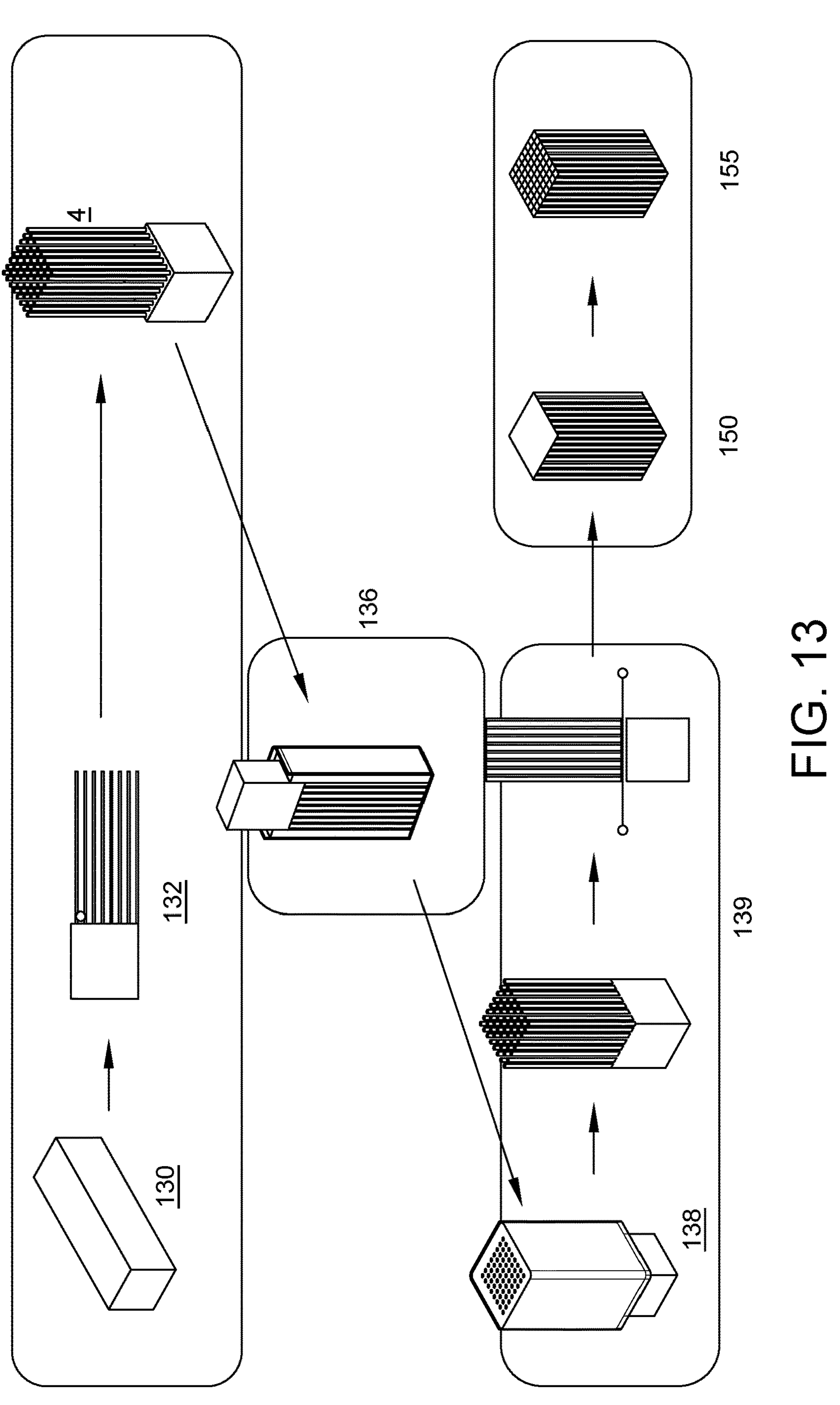
FIG. 13 is a process flowchart for EDM wire processing and molding.

FIG. 13 illustrates steps in manufacturing an array of conductive wires 4 using Electrical Discharge Machining (EDM step 132) from a support stock 130. The wires are rigid enough to support themselves in this high-aspect ratio array, while being supported and moveable in the remaining stock 130. The array of wires is placed in a mold and filled with the flowable damping material (e.g., epoxy) to set the backing layer. In step 139, the molded backing layer is placed on a precision base, so that the mold walls can be machined away and top of the backing layer can be machined flat. Base 130 may be machined away or cut off by EDM. In step 150, the backing layer block is plated with a conductive layer at top and bottom of the wires. In step 155, kerf cuts are made through the plating to leave an array of pads to be connected to the transducer array 14 at one end and ASIC 3 or interconnects 15/16 at the other end.

The transducer stack may include an adhesive layer between the backing layer 7 and the transducer's electrodes 6 and/or between the backing layer and the interconnect's bond pads. The adhesive mechanically binds the layers while entrained conductive particles complete the electrical connection. The layer may be a pressure sensitive adhesive.

Terms such as "top", "bottom", "distal", "proximate" "plan", "side", "below," "above," are used herein for simplicity in describing relative positioning of elements of the transducer, as depicted in the drawings or with reference to the surface datum. In practice, the transducer and the manufacturing process may be placed in any orientation without departing from the invention, as described.

The invention claimed is:

1. A method of manufacturing an ultrasonic transducer comprising the steps of:

a. providing an ultrasonic transducer layer having a two-dimensional array of electrodes defining ultrasonic elements;

b. providing an electrical interconnect layer having a two-dimensional array of bond pads;

c. providing a two-dimensional array of conductive wires;

d. flowing a non-conductive, acoustic damping material around the wires;

e. setting the non-conductive, acoustic damping material to form an acoustic backing layer having a thickness of at least 4 mm; and f. electrically coupling the conductive wires at their first ends to the bond pads of the electrical interconnect layer and at their second ends to the electrodes of the ultrasonic transducer layer.

2. The method of claim 1, further comprising enclosing the conductive wires in a mold prior to flowing and setting the acoustic damping material, which mold has a width and length sufficient to cover the ultrasonic transducer layer's array of electrodes and a thickness of at least 4 mm.

3. The method of claim 1, wherein the two-dimensional array of conductive wires are supported at their first and second ends by first and second support substrates respectively, which support substrates are parallel to and offset from each other by at least 4 mm.

4. The method of claim 1, wherein the two-dimensional array of conductive wires is created by a wire bonding tool that bonds the array of wires between first conductive pads of a first support substrate and second conductive pads of a second support substrate.

5. The method of claim 3, wherein the first support substrate is one of: the ultrasonic transducer layer or the electrical interconnect layer, wherein the electrical interconnect layer is preferably an integrated circuit (IC), Application Specific Integrated Circuits (ASIC), or Low Temperature Co-Fired Ceramic.

6. The method of claim 3, wherein the second support substrate is a sacrificial substrate, preferably a circuit board, the method further comprising the step of removing the sacrificial substrate after the steps of flowing and setting.

7. The method of claim 3, further comprising removing one or both support substrates by machining, grinding, or etching to provide a flat surface of the backing layer, preferably further comprising adding a metal layer over this flat surface, then cutting through the metal layer to form an array of backing layer pads.

8. The method of claim 4, wherein the first support substrate and second support substrate are not co-planar, preferably forming an angle of 60-120° to each other, more preferably wherein the support substrates are orthogonal to each other.

9. The method of claim 1, wherein the two-dimensional array of spaced-apart conductive wires is created by Electrical Discharge Machining.

10. The method of claim 1, wherein the two-dimensional array of spaced-apart conductive wires is created by inserting an array of rigid pins into arrays of guide holes on first and second support substrates that are spaced apart.

11. The method of claim 1, further comprising providing an adhesive layer between the backing layer and the array of electrodes or array of bond pads, said adhesive layer entraining conductive particles.

12. The method of claim 1, wherein the array of conductive wires has a pitch the same as the transducer's electrodes and as the electrical interconnect layer's bond pads.

13. An acoustic device comprising:

a. an ultrasonic transducer layer having a two-dimensional array of electrodes defining ultrasonic elements;

b. an electrical interconnect layer having a two-dimensional array of bond pads;

c. a two-dimensional array of conductive wires, electrically coupled at their first ends to the bond pads of the electrical interconnect layer and at their second ends to the electrodes of the ultrasonic transducer layer; and d. a non-conductive, acoustic damping material formed around the wires, to form an acoustic backing layer having a thickness of at least 4 mm.

14. The acoustic device of claim 13, wherein the electrical interconnect layer is one of: an integrated circuit (IC), Application Specific Integrated Circuit (ASIC), or Low Temperature Co-Fired Ceramic (LTCC).

15. The acoustic device of claim 13, further comprising an array of backing layer pads connected to the first and/or second ends of the wires.

16. The acoustic device of claim 13, wherein the electrical interconnect layer and the ultrasonic transducer layer are not co-planar, preferably forming an angle of 60-120° to each other, more preferably orthogonal to each other.

17. The acoustic device of claim 13, further comprising an adhesive layer between the backing layer and the array of electrodes or array of bond pads, said adhesive layer entraining conductive particles.

18. The acoustic device of claim 13, wherein the array of conductive wires has the same pitch as the electrodes and as the electrical interconnect layer bond pads.

19. The device of claim 13, wherein the non-conductive, acoustic damping material comprises non-conductive epoxy, preferably having an acoustic impedance lower than the acoustic transducer layer, more preferably having an acoustic impedance between 7 and 12 MRayls.

20. A method of manufacturing an ultrasound stack comprising the steps of:

wire bonding a plurality of wires between first conductive pads of a first support substrate and second conductive pads of a second support substrate; and flowing a non-conductive, acoustic damping material around the wires to set and form an acoustic backing layer that is 4-6 mm thick, wherein the first support substrate is a two-dimensional ultrasonic transducer array or the plurality of wires are connected at first ends to said two-dimensional ultrasonic transducer array, and wherein the second support substrate is a two-dimensional electrical interconnect layer or the plurality of wires are connected at second ends to said two-dimensional electrical interconnect layer.

* * * * *